(12) United States Patent
Yamaguchi et al.

(10) Patent No.: US 11,897,323 B2
(45) Date of Patent: Feb. 13, 2024

(54) VEHICLE MOUNTING STRUCTURE FOR POWER STORAGE DEVICE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Koji Yamaguchi, Yokkaichi (JP); Hiroki Hirai, Yokkaichi (JP); Ryoya Okamoto, Yokkaichi (JP); Taiji Yanagida, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 233 days.

(21) Appl. No.: 17/417,264

(22) PCT Filed: Dec. 13, 2019

(86) PCT No.: PCT/JP2019/048918
§ 371 (c)(1),
(2) Date: Jun. 22, 2021

(87) PCT Pub. No.: WO2020/137613
PCT Pub. Date: Jul. 2, 2020

(65) Prior Publication Data
US 2022/0063425 A1    Mar. 3, 2022

(30) Foreign Application Priority Data

Dec. 26, 2018  (JP) ................................. 2018-242444

(51) Int. Cl.
*B60K 1/04*  (2019.01)
*B60L 50/64*  (2019.01)
(Continued)

(52) U.S. Cl.
CPC ................ *B60K 1/04* (2013.01); *B60L 50/64* (2019.02); *B60R 16/0207* (2013.01);
(Continued)

(58) Field of Classification Search
CPC ... B60K 1/04; B60K 2001/0438; B60L 50/64; H01M 50/249; H01M 50/209; H01M 50/298; B60R 16/0207
See application file for complete search history.

(56) References Cited

U.S. PATENT DOCUMENTS 9,937,801 B2    4/2018   Kusumi et al.
2009/0186266 A1  7/2009   Nishino et al.
(Continued)

FOREIGN PATENT DOCUMENTS

| DE | 102015221339 A1 * | 5/2017 | |
| DE | 102015221339 A1 * | 5/2017 | ............... B60K 1/04 |

(Continued)

OTHER PUBLICATIONS

Feb. 10, 2020 International Search Report issued in International Patent Application No. PCT/JP2019/048918.

*Primary Examiner* — James A Shriver, II
*Assistant Examiner* — Nicholas R. Kandas
(74) *Attorney, Agent, or Firm* — Oliff PLC

(57) ABSTRACT

A vehicle mounting structure including: a vehicle frame having a floor panel mounted thereabove; and a power storage device assembled under the vehicle frame, wherein: a protrusion is arranged in the power storage device that can be vertically fitted into a recess in the vehicle frame, and a (Continued)

plurality of electrical wires are arranged inside the protrusion arranged in the power storage device.

5 Claims, 8 Drawing Sheets

(51) Int. Cl.
| | | |
|---|---|---|
| *B60R 16/02* | (2006.01) | |
| *H01M 50/209* | (2021.01) | |
| *H01M 50/249* | (2021.01) | |
| *H01M 50/298* | (2021.01) | |

(52) U.S. Cl.
CPC ....... *H01M 50/209* (2021.01); *H01M 50/249* (2021.01); *H01M 50/298* (2021.01); *B60K 2001/0438* (2013.01)

(56) References Cited

U.S. PATENT DOCUMENTS

| | | |
|---|---|---|
| 2012/0321927 A1* | 12/2012 | Loo |
| 2014/0322568 A1 | 10/2014 | Sakai et al. |
| 2014/0374180 A1 | 12/2014 | Katayama et al. |
| 2021/0339617 A1* | 11/2021 | Ohkuma |

FOREIGN PATENT DOCUMENTS

| | | | | |
|---|---|---|---|---|
| JP | 2018-101627 A | | 6/2018 | |
| JP | 2018101627 A | * | 6/2018 | |
| JP | 2018101627 A | * | 6/2018 | |
| WO | WO 2012028929 A1 | * | 3/2012 | |
| WO | WO-2012028929 A1 | * | 3/2012 | ............. H01G 11/18 |

\* cited by examiner

VEHICLE MOUNTING STRUCTURE FOR POWER STORAGE DEVICE

BACKGROUND

A technology disclosed in this specification relates to a vehicle mounting structure for a power storage device.

For example, JP 2016-220475A is known as a battery system mounted in a vehicle. This battery system is arranged under a floor of the vehicle and is configured to house, within a case, (i) a high output type battery pack and (ii) a junction box arranged above the high output type battery pack.

SUMMARY

Incidentally, if this type of battery system is assembled under a vehicle frame which is a framework of a vehicle, (i) a case cover, (ii) a junction box, (iii) a battery pack, (v) a case that houses the battery pack, and the like are vertically stacked under a lower surface of the vehicle frame having a floor panel and the like mounted thereabove. Further, a wire harness that connects devices mounted in the vehicle is routed between the floor panel and the vehicle frame, and the like. Thus, a vehicle mounting structure for a power storage device such as a battery system has a large vertical height dimension. As a result, a passenger compartment of the vehicle is compressed, whereby the space inside the vehicle becomes small.

An exemplary aspect of the disclosure reduces the size of a vehicle mounting structure for a power storage device.

An exemplary vehicle mounting structure includes: a vehicle frame having a floor panel mounted thereabove; and a power storage device assembled under the vehicle frame, wherein: a protrusion is arranged in the power storage device that can be vertically fitted into a recess in the vehicle frame, and a plurality of electrical wires are arranged inside the protrusion arranged in the power storage device.

According to the vehicle mounting structure, the vehicle frame having the floor panel mounted thereabove and the power storage device are arranged at the same height position. That is, compared to a conventional case in which the power storage device is assembled so as to be stacked vertically on the lower surface of the vehicle frame, for a length dimension of a fitting direction in which the frame recessed part and the cover protrusion vertically fit with each other, the height dimension of the vehicle mounting structure for the power storage device can be made small.

The vehicle mounting structure for the power storage device that is disclosed in this specification may have the following configuration.

The power storage device may have (i) a plurality of power storage modules and (ii) a power storage cover assembled to the plurality of power storage modules so as to cover the tops of the plurality of power storage modules. In the power storage cover, a plurality of electrical wires may be aligned flat and fixed along a surface of the power storage cover.

According to such a configuration, a plurality of electrical wires is fixed flat along the surface of the power storage cover of the power storage device. Thus, for example, compared to a case in which a bundle of electrical wires bundling a plurality of electrical wires connecting between devices is routed above the surface of the floor panel, between the vehicle frame, and the like, the vehicle mounting structure can be vertically made smaller.

The plurality of electrical wires may include (i) a plurality of small-diameter electrical wires and (ii) a plurality of large-diameter electrical wires whose diameter is larger than that of the plurality of small-diameter electrical wires. A horizontal width dimension of a large-diameter electrical wire of the plurality of large-diameter electrical wires may be set to be larger than a vertical height dimension of the large-diameter electrical wire.

According to such a configuration, the large-diameter electrical wires are flattened to reduce the height dimension. Thus, compared to electrical wires having substantially the same height and width dimensions, large-diameter electrical wires having a larger cross-sectional area can be routed in a space between the power storage modules and the power storage cover.

In other words, the large-diameter electrical wires having a large cross-sectional area can be routed in the space, that was originally a wasted space, between the power storage modules and the power storage cover. Thus, compared to a case in which the large-diameter electrical wires are routed between the surface of the floor panel and the vehicle frame, the vehicle mounting structure can be made even smaller vertically.

The plurality of electrical wires may be fixed to the surface at a power storage modules side of the power storage cover.

In general, when electrical wires are routed, exterior members are attached to the outer circumference of the electrical wires so as to suppress other members and the like from coming into contact with the electrical wires and damaging them. However, when exterior members are attached to respective electrical members, the vertical height of the electrical wires becomes large, and as the number of parts increases, the man-hours for assembling exterior members and manufacturing costs increase.

However, according to such a configuration, the plurality of electrical wires connecting between devices is routed within the power storage device; thus, exterior members that protect the plurality of electrical wires can be eliminated. Thus, for the portion that does not require the exterior members, the power storage device, and ultimately, the height dimension of the vehicle mounting structure, can be made smaller. At the same time, the number of parts can be reduced. Further, the plurality of electrical wires is routed within the power storage device, so routing of the electrical wires between devices can be completed simply by securing a location in which the power storage device is assembled with the vehicle. Therefore, routing of the electrical wires can be completed without designing the route of the electrical wires for each vehicle type.

A predetermined number of the electrical wires of the plurality of electrical wires may connect the plurality of power storage modules with each other.

In general, when the power storage modules in the power storage device are connected to each other with the electrical wires, the electrical wires are routed between the power storage modules. Accordingly, it is necessary to secure an area for routing electrical wires other than an area for arranging the power storage modules, and the overall space becomes large in which the power storage modules are arranged. It is difficult to enlarge the arrangement space in the vehicle, and when it is not possible to secure a large arrangement space, the power storage modules become small, whereby a power storage capacity of the power storage device becomes small.

However, according to the above configuration, the plurality of electrical wires connecting the power storage modules with each other within the power storage device is aligned flat and routed at the power storage cover covering the power storage modules. Thus, for example, compared to cases in which electrical wires are arranged between power storage modules and a bundle of electrical wires is routed above the power storage modules, the power storage device can be made small vertically while suppressing an increase in space at which the power storage modules are arranged.

According to the technology disclosed in this specification, the vehicle mounting structure for a power storage device can be made smaller.

DETAILED DESCRIPTION OF EMBODIMENTS

Embodiment

An embodiment of technology disclosed in this specification will be explained with reference to FIGS. 1-7.

This embodiment shows a vehicle mounting structure 10 for a power storage device 40.

A vehicle C is configured to include (i) a vehicle frame 20 made of metal, (ii) a body panel 30 mounted on the vehicle frame 20, (iii) a power storage device 40 that is assembled under the vehicle frame 20, and the like. Additionally, in the following explanation, a front-back direction is based on a right-left direction in FIGS. 1 and 4, an F side is a front side, and a B side is a rear side. Further, the right-left direction is described with "diagonally to the left front side" (L side) of FIG. 2 as the left side and "diagonally to the right rear side" (R side) of FIG. 2 as the right side.

Figure 2:
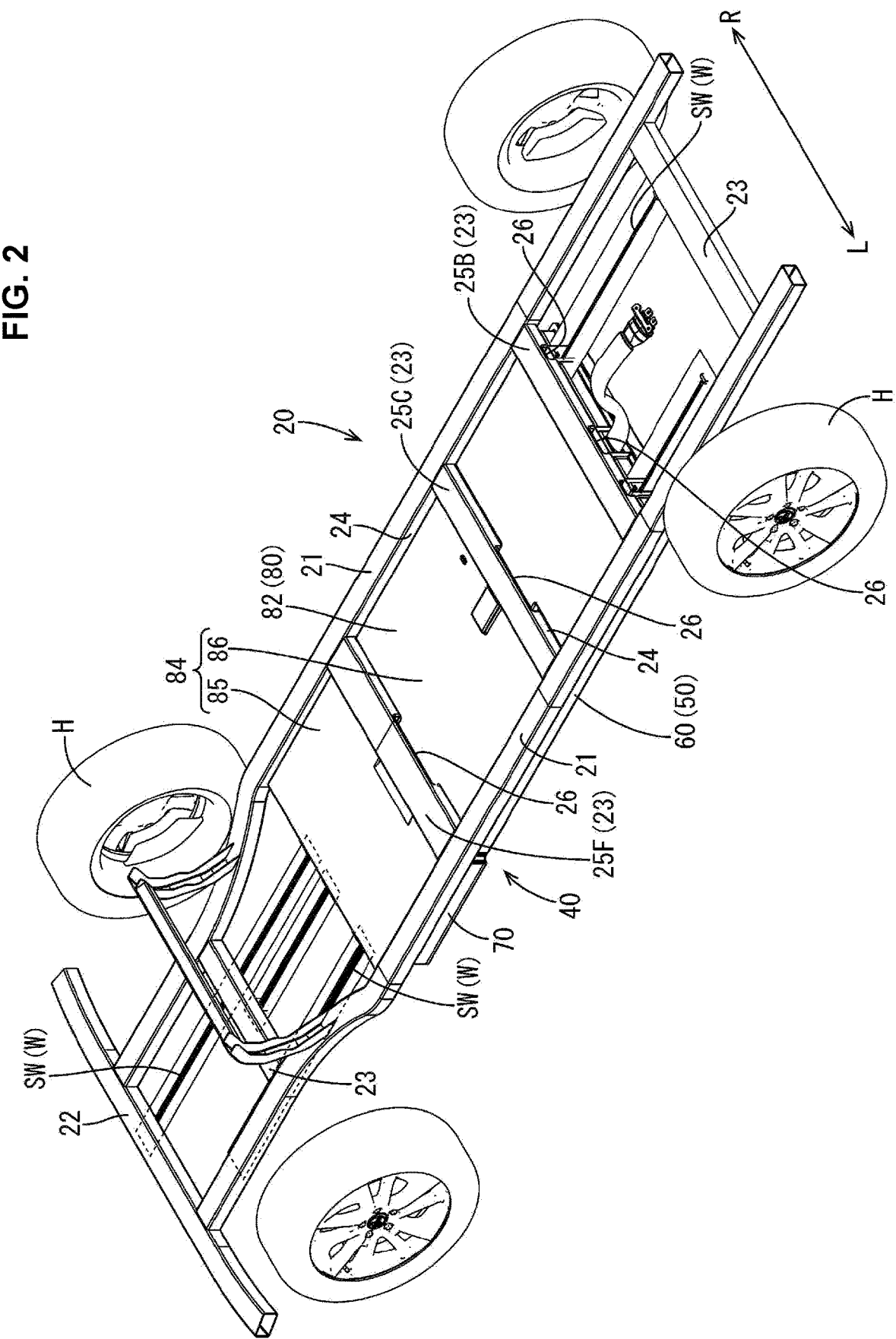
FIG. 2 is a perspective view showing a state in which the power storage device is assembled to a vehicle frame.

As shown in FIG. 2, the vehicle frame 20 is formed in a ladder shape, including (i) a pair of side frames 21 that extends in the front-back direction, (ii) a front frame 22 that connects front end portions of the pair of side frames 21, and (iii) a plurality of cross frames 23 that connects between the pair of side frames 21 in the right-left direction. This is a so-called "ladder frame." That is, the vehicle frame 20 is provided with frame recessed parts 24 that open vertically between the side frames 21 and the cross frames 23.

In this embodiment, five cross frames 23 are provided between the pair of side frames 21. Wheels H are arranged on both sides, in the right-left direction, of the frontmost cross frames 23 and the rearmost frames 23 among the five cross frames 23. The three cross frames 23 arranged in the center are support frames 25 that support a body panel 30 from below, together with the pair of side frames 21.

Figure 3:
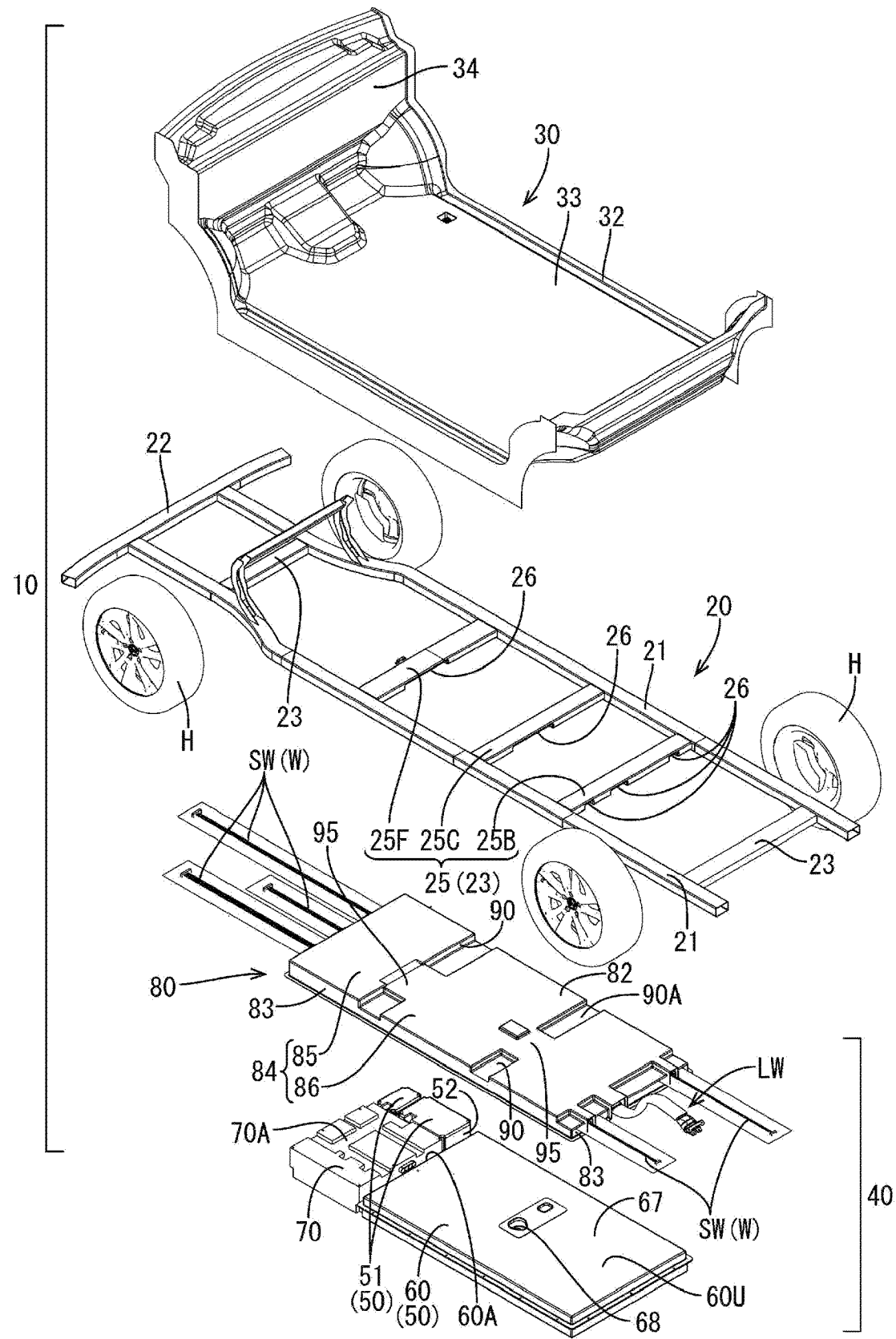
FIG. 3 is an exploded perspective view showing a state before the power storage device is assembled to the vehicle frame.

As shown in FIG. 3, the body panel 30 constitutes a passenger compartment RM and is configured to include (i) a floor panel 32 arranged above the vehicle frame 20 and (ii) a front panel 34 arranged at a front peripheral portion of the floor panel 32.

The floor panel 32 has a floor portion 33 that is flat, and the front panel 34 is erectly arranged so that it is connected to the front peripheral portion of the floor panel 32. The floor portion 33 is arranged along a top surface of (i) a substantially central portion, in the front-back direction, of the pair of side frames 21 and (ii) the support frames 25.

Figure 1:
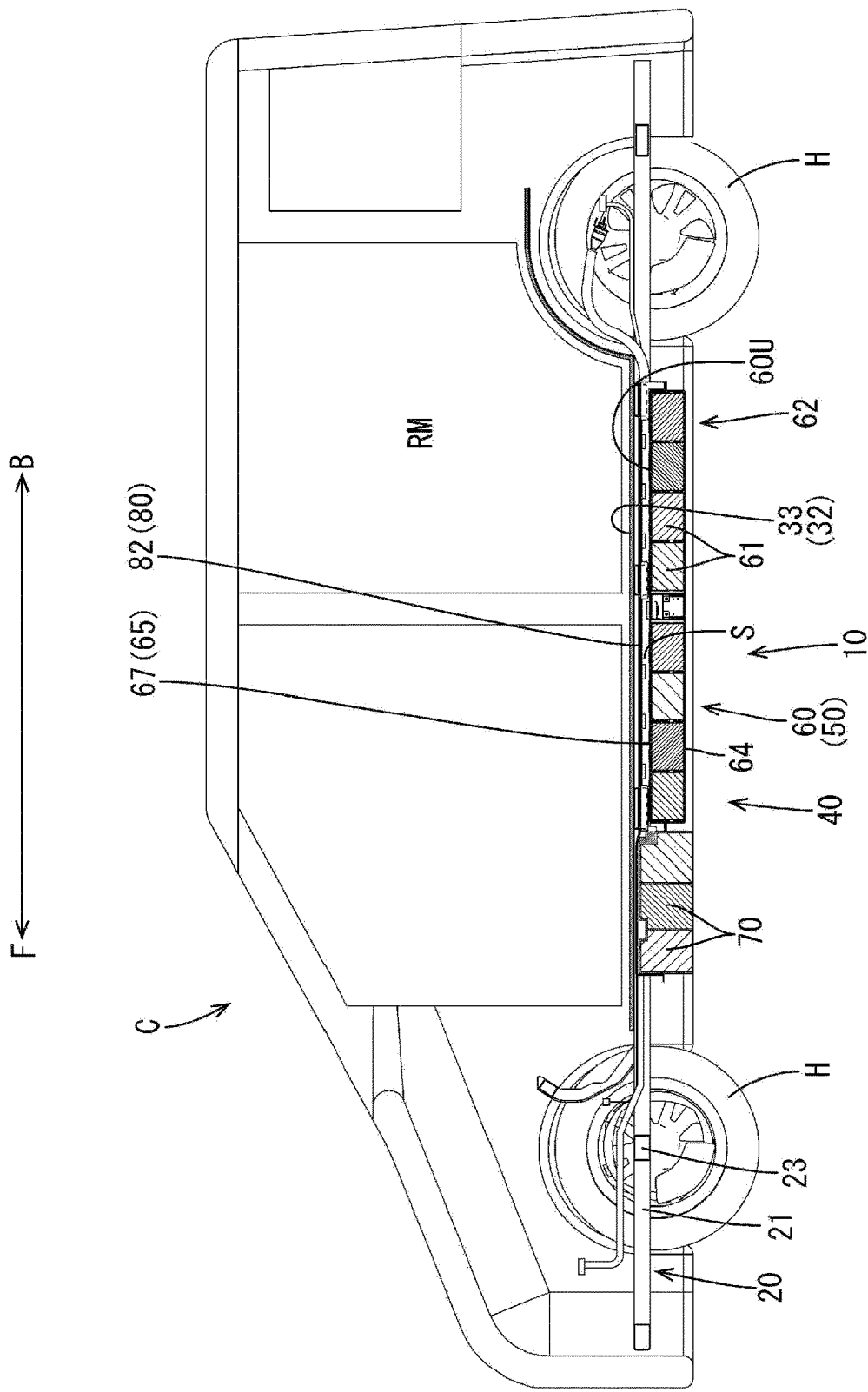
FIG. 1 is a vertical cross-sectional view of a vehicle mounting structure for a power storage device according to an embodiment.

As shown in FIGS. 1-3, the power storage device 40 is configured to be assembled to the lower portion of the vehicle frame 20 from below. When the power storage device 40 is assembled to the vehicle frame 20, the power storage device 40 is arranged in an area between (i) a position slightly forward of the front support frame 25F, which is arranged at the front side among the three support frames 25, and (ii) a rear support frame 25B arranged at the rear side.

As shown in FIGS. 1-3, the power storage device 40 is formed in a flat box shape that is long in the front-back direction and is substantially rectangular in plan view. The power storage device 40 is configured to include (i) a plurality of power storage modules 50, (ii) multi-boxes 70, and (iii) a power storage cover member 80 (power storage cover) collectively covering the power storage modules 50 and the multi-boxes 70.

The plurality of power storage modules 50 includes (i) low-voltage power storage modules 51 having relatively low voltage among the plurality of power storage modules 50 and (ii) a high-voltage power storage module 60 having relatively high voltage among the plurality of power storage modules 50. As shown in FIG. 3, the power storage device 40 of this embodiment includes (1) two types of low-voltage power storage modules 51 and (ii) one type of high-voltage power storage module 60.

Figure 5:
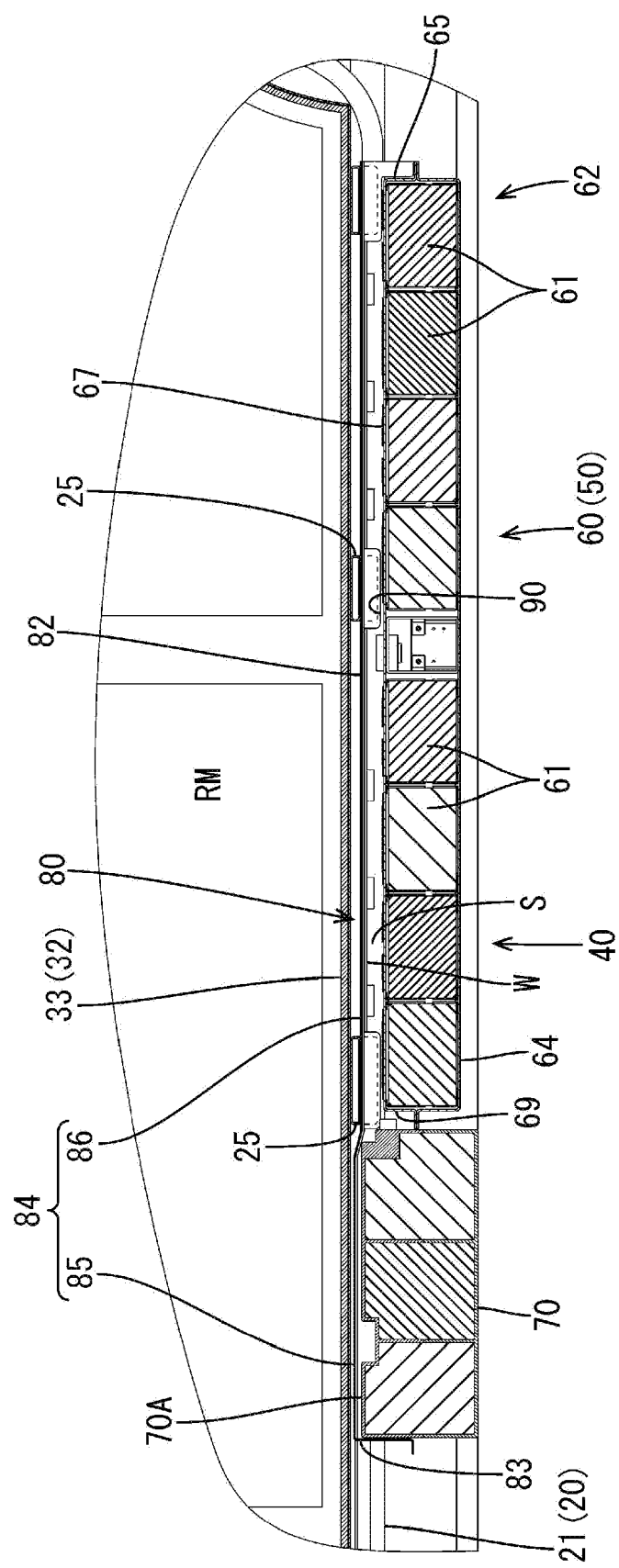
FIG. 5 is an expanded sectional view of the power storage device portion of FIG. 1.
Figure 6:
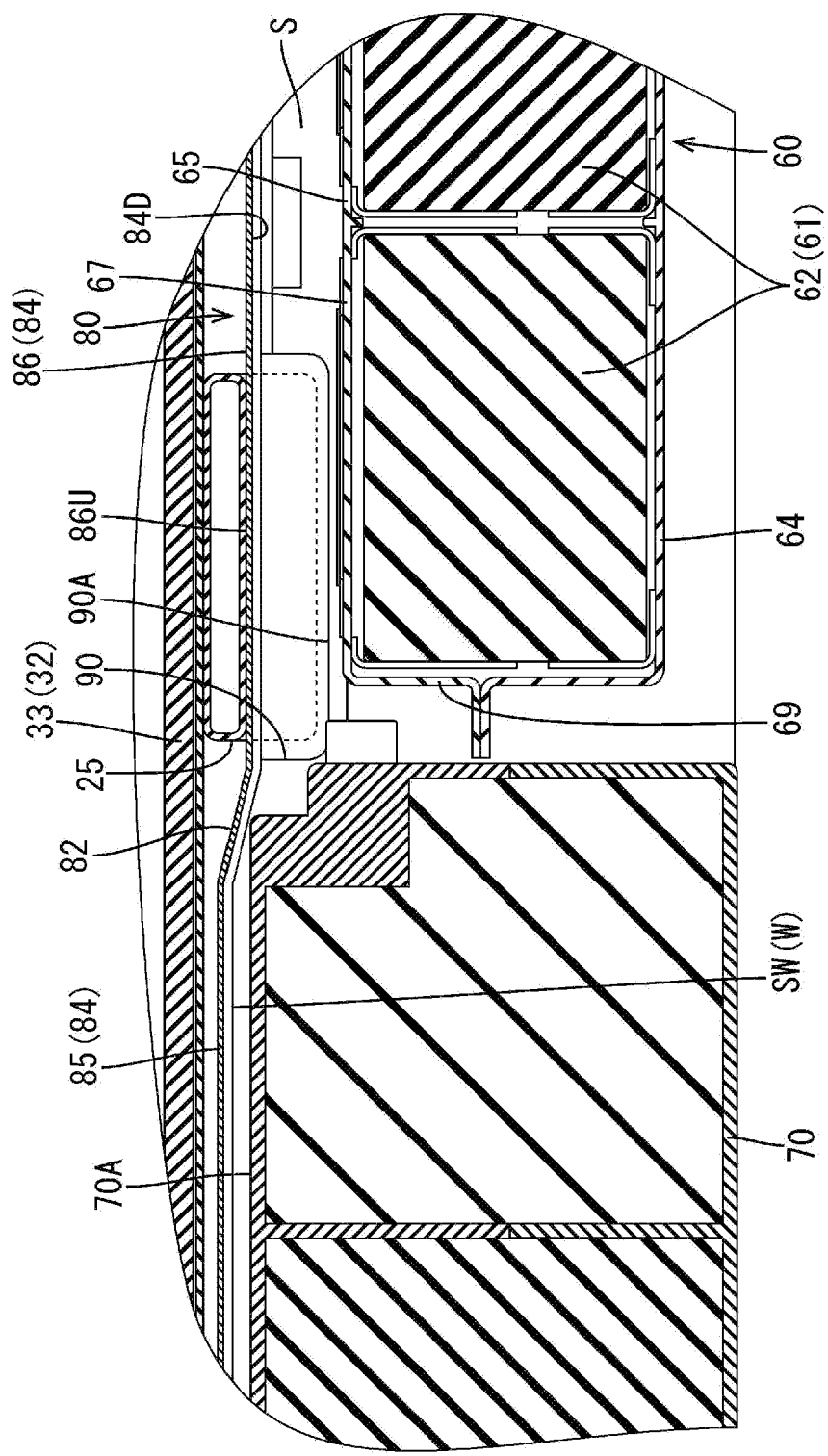
FIG. 6 is an expanded sectional view of a main portion of FIG. 5.
Figure 7:
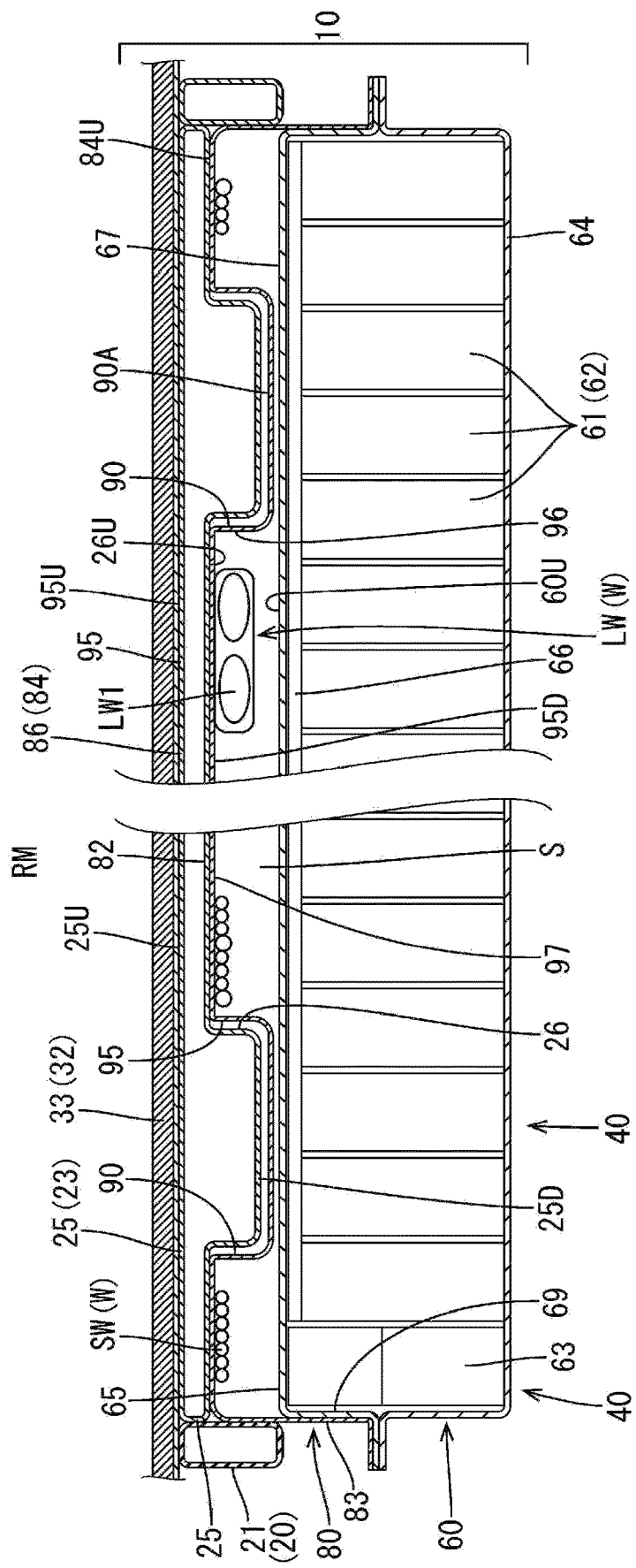
FIG. 7 is a conceptual diagram of a cross section of a structure for arranging the power storage device in the vehicle.

As shown in FIG. 3, when viewed from above, the high-voltage power storage module 60 is two-thirds the size of the power storage device 40 and is formed in a flat box shape that is substantially rectangular in plan view. Further, as shown in FIGS. 5-7, the high-voltage power storage module 60 is configured to include (i) a power storage element group 62 constituted by a plurality of power storage elements 61, (ii) a junction box 63 connected to the power storage element group 62, (iii) a lower case 64 housing the power storage element group 62 and the junction box 63, and (v) an upper case 65 fixed to the lower case 64 so as to collectively cover the plurality of power storage element group 62 and the junction box 63 from above.

The lower case 64 is made of metal and opens upward in a substantially rectangular shape. As shown in FIGS. 5 and 7, the plurality of power storage elements 61 are aligned within the lower case 64 so as to form the power storage element group 62. A connection module 66 that connects the power storage elements 61 adjacent to each other is assembled to the upper portion of the power storage element group 62. An undepicted connection conductor, such as a bus bar through which a large current flows, is connected to the connection module 66. The connection conductor is connected to the junction box 63 arranged adjacent to the power storage element group 62.

The junction box 63 has a substantially rectangular box shape. An undepicted protection member, such as a current cutoff relay, is housed in the junction box 63. An undepicted electrical wire is extended from the junction box 63. At the end of the electrical wire, an undepicted connector is arranged that is inserted through a through hole 68 arranged in the later-mentioned upper case 65.

The upper case 65 is made of metal and has a lid plate 67 that is slightly larger than the upper opening of the lower case 64 and has a substantially rectangular shape in plan view as shown in FIG. 3. In the center of the lid plate 67, the through hole 68, which passes vertically through the lid plate, is arranged. The lid plate 67 is fixed in a state in which the connector of the electrical wire extending from the junction box 63 is inserted through the through hole 68. As shown in FIGS. 5-7, an extension board 69 extending downward is arranged at respective side peripheries of the lid plate 67. The extension board 69 is fixed to the lower case 64 by an undepicted fixing mechanism, whereby the upper case 65 is fixed to the lower case 64. Further, an undepicted seal member seals between the upper case 65 and the lower case 64.

As shown in FIG. 3, each of the low-voltage power storage modules 51 is formed so as to house, within a small case 52, an undepicted power storage element group constituted by a plurality of power storage elements. Each of the low-voltage power storage modules 51 is formed with a slightly larger height dimension than the high-voltage power storage module 60, but is smaller than the high-voltage power storage module 60 in the front-back and right-left directions. Further, the low-voltage power storage modules 51 are arranged side by side in the front-back direction so as to be adjacent to a short side 60A at a front side extending in the right-left direction of the high-voltage power storage module 60. Of the two types of low-voltage power storage modules 51, one type is a 12V low-voltage power storage module 51, and another type is a 48V low-voltage power storage module 51.

As shown in FIG. 3, two multi-boxes 70 are arranged in the front-back direction so as (i) to be adjacent to the low-voltage power storage modules 51 in the right-left direction and (ii) to be adjacent to the short side 60A of the high-voltage power storage module 60. Each multi-box 70 is configured to include, for example, a high-voltage junction box, a plurality of DC-DC converters, a charger, and the like. Similarly to the low-voltage power storage modules 51, each multi-box 70 is set with a slightly larger height dimension than the high-voltage power storage module 60. As shown in FIGS. 5 and 6, each multi-box 70 protrudes above the high-voltage power storage module 60.

Figure 4:
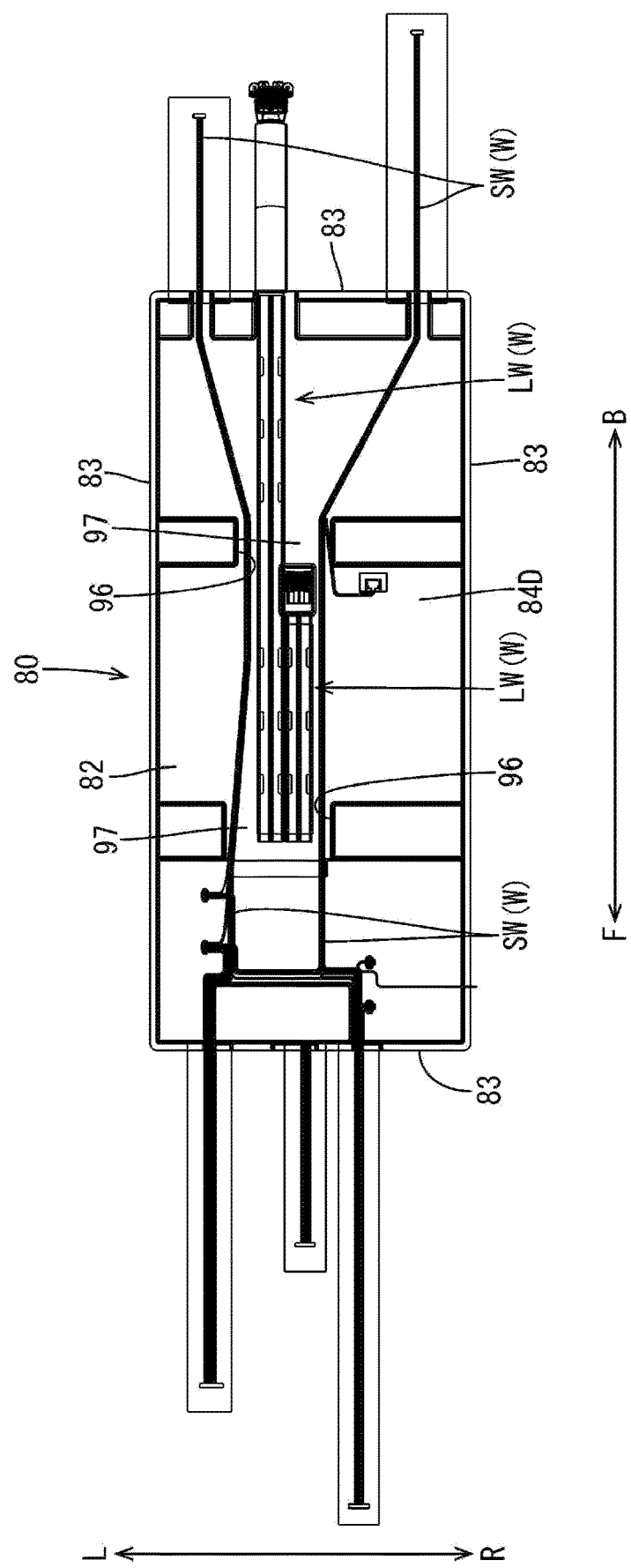
FIG. 4 is a bottom view of a power storage cover.

The power storage cover member 80 is made of metal and is configured to be assembled to the plurality of power storage modules 50 and the multi-boxes 70 from above as shown in FIGS. 5 and 6. Further, as shown in FIG. 3, the power storage cover member 80 has a top plate 82 having a substantially rectangular shape in plan view. The top plate 82 is sized to collectively cover the plurality of power storage modules 50 and the multi-boxes 70 from above. As shown in FIGS. 3-5, four side plates 83 extending downward are arranged at side peripheries of the top plate 82. The side plates 83 adjacent to each other are connected in a circumferential direction, whereby the power storage cover member 80 is formed in a flat box shape that opens downward.

Additionally, as shown in FIGS. 5 and 7, a vertical height dimension of each side plate 83 is approximately half of a height dimension of the low-voltage power storage modules 51 and the multi-boxes 70. When the power storage cover member 80 is assembled to the plurality of power storage modules 50 and the multi-boxes 70, it covers the top half of the low-voltage power storage modules 51, the high-voltage power storage module 60, and the multi-boxes 70, whereby it has a function of electromagnetically shielding the low-voltage power storage modules 51, the high-voltage power storage module 60, and the multi-boxes 70.

Incidentally, as shown in FIGS. 3, 4, and 7, the top plate 82 of the power storage cover member 80 has (i) a cover protrusion part 84 that fits into the frame recessed parts 24 of the vehicle frame 20 from below, and (ii) a plurality of cover recessed parts 90 into which the support frames 25 of the vehicle frame 20 fit from above.

The cover protrusion part 84 has (i) a high protrusion part 85 covering the low-voltage power storage modules 51 and the multi-boxes 70 and (ii) a low protrusion part 86 covering the high-voltage power storage module 60.

The high protrusion part 85 is arranged in front of the front support frame 25F. As shown in FIG. 5, the height dimension of the high protrusion part 85 is formed to have substantially the same protruding dimension as the vertical height dimensions of the side frames 21 and the support frames 25. When the power storage cover member 80 is fixed to the vehicle frame 20 from below, the high protrusion part 85 is arranged at the same height as the side frames 21 and the support frames 25 and is completely housed within the frame recessed parts 24 when viewed from the side.

As shown in FIG. 5, the protrusion dimension of the low protrusion part 86 is set to be slightly smaller than that of the high protrusion part 85 according to the height dimension of the high-voltage power storage module 60. When the power storage cover member 80 is fixed to the vehicle frame 20 from below, parts of the low protrusion part 86 corresponding to the frame recessed parts 24 are (i) arranged at the same height as the side frames 21 and the support frames 25, in a condition in which there is space S provided slightly above and (ii) completely housed within the frame recessed parts 24 when viewed from the side.

Further, as shown in FIGS. 4 and 7, the high protrusion part 85 and the low protrusion part 86 arranged within the frame recessed parts 24 are such that a lower surface 84D is recessed upward as an upper surface 84U protrudes upward. As shown in FIG. 4, along the lower surface 84D of the high protrusion part 85 and the low protrusion part 86, a plurality of electrical wires W is horizontally aligned flat and fixed to the lower surface 84D that is a surface at the power storage modules 50 side of the high protrusion part 85 and the low protrusion part 86.

The plurality of electrical wires W includes (i) a plurality of small-diameter electrical wires SW and (ii) a plurality of large-diameter electrical wires LW whose diameter is larger than that of the plurality of small-diameter electrical wires SW.

The plurality of small-diameter electrical wires SW connects (i) each of the low-voltage power storage modules 51 and undepicted electrical devices arranged at front and rear end portions of the vehicle C, (ii) the multi-boxes 70 and each of the low-voltage power storage modules 51, and the like. As shown in FIG. 4, the plurality of small-diameter electrical wires SW is aligned flat in the left-right direction and fixed along the lower surface 84D of the high protrusion part 85 and the low protrusion part 86.

The plurality of large-diameter electrical wires LW connects (i) the high-voltage power storage module 60 and the multi-boxes 70, (ii) the high-voltage power storage module 60 and an undepicted inverter, and the like. Similarly to the small-diameter electrical wires SW, the plurality of large-diameter electrical wires LW is aligned flat in the left-right direction and fixed along the lower surface 84D of the high protrusion part 85 and the low protrusion part 86. The large-diameter electrical wires LW are flat and the vertical height dimension is smaller than the width dimension in the left-right direction. A cross section of a core wire LW1 is formed in an oval or rounded square shape. The vertical height dimension of the large-diameter electrical wires LW is set to be smaller than a depth dimension of the space S between a top surface 60U of the high-voltage power storage module 60 and the power storage cover member 80.

For a method of fixing the respective small-diameter electrical wires SW and the respective large-diameter electrical wires LW, coating of the electrical wires W may be fused to the lower surface 84D of the high protrusion part 85 and the low protrusion part 86. An undepicted fusion sheet on which the plurality of small-diameter electrical wires SW or the plurality of large-diameter electrical wires LW is aligned flat and fused or sewn may be fused to the lower surface 84D of the high protrusion part 85 and the low protrusion part 86. Further, the plurality of small-diameter electrical wires SW and the plurality of large-diameter electrical wires LW may be aligned flat and fixed according to a known fixing method, for example, (i) the plurality of small-diameter electrical wires SW and the plurality of large-diameter electrical wires LW may be fixed with adhesive coated on the lower surface 84D of the high protrusion part 85 and the low protrusion part 86, (ii) the plurality of small-diameter electrical wires SW and the plurality of large-diameter electrical wires LW may be fixed to the lower surface 84D of the high protrusion part 85 and the low protrusion part 86 with double-sided tape, and the like.

In other words, as shown in FIGS. 5-7, the plurality of small-diameter electrical wires SW and the plurality of large-diameter electrical wires LW in the low protrusion part 86 are routed in a space S, which was originally a wasted space, between the top surface 60U of the high-voltage power storage module 60 and the power storage cover member 80. Further, in the high protrusion part 85, the plurality of small-diameter electrical wires SW is arranged at a recessed groove 70A arranged so as to be recessed at the top surfaces of the multi-boxes 70.

As shown in FIGS. 3 and 7, at parts of the low protrusion part 86 corresponding to the support frames 25, cover recessed parts 90 are arranged in which the support frames 25 fit from above. Parts different from the cover recessed parts 90 are fitting protrusion parts 95 that can be fitted from below into notch recessed parts 26 arranged at the support frames 25.

As shown in FIG. 7, the notch recessed parts 26 of the support frames 25 are recessed upward from lower surfaces 25D of the support frames 25. As shown in FIG. 3, the notch recessed parts 26 arranged at a center support frame 25C and the front support frame 25F that are located at the center of the support frames 25 are substantially in the center, in the right-left direction. The notch recessed parts 26 of the rear support frame 25B are placed in a total of three locations: two notch recessed parts 26 are located on both sides of the rear support frame 25B, in the right-left direction, and one notch recessed part 26 of the rear support frame 25B is located slightly to the left of substantially the center, in the right-left direction.

A depth dimension of the respective notch recessed parts 26 (a length dimension from the lower surface 25D of the support frames 25 to an upper inner surface 26U of the notch recessed parts 26) is set to be slightly larger than a protruding dimension of the respective fitting protrusion parts 95. When the power storage cover member 80 is fixed to the vehicle frame 20 from below, as shown in FIG. 7, the fitting protrusion parts 95 are fitted into the notch recessed parts 26 from below, and a top surface 95U of the fitting protrusion parts 95 contacts the upper inner surface 26U of the notch recessed parts 26.

As shown in FIGS. 4 and 7, the fitting protrusion parts 95 become electrical wire routing grooves 96 in which a lower surface 95D is recessed upward as the upper surface 95U protrudes upward. The electrical wire routing grooves 96 communicate, in the front-back direction, with the high protrusion part 85 and the low protrusion part 86 that are arranged within the frame recessed parts 24. The plurality of small-diameter electrical wires SW and the plurality of large-diameter electrical wires LW that are fixed to the lower surface 84D of the high protrusion part 85 and the low protrusion part 86 are fixed within the electrical wire routing grooves 96 so as to pass through. Using a method similar to the plurality of small-diameter electrical wires SW and the plurality of large-diameter electrical wires LW fixed to the lower surface 84D of the high protrusion part 85 and the low protrusion part 86, the plurality of small-diameter electrical wires SW and the plurality of large-diameter electrical wires LW within the electrical wire routing grooves 96 are aligned flat in the right-left direction and fixed along inner surfaces 97 (upper inner surfaces) of the electrical wire routing grooves 96.

In other words, as shown in FIGS. 5 and 7, in the electrical wire routing grooves 96 as well, the plurality of small-diameter electrical wires SW and the plurality of large-diameter electrical wires LW are routed in the space S, that was originally a wasted space, between the top surface 60U of the high-voltage power storage module 60 and the power storage cover member 80.

As shown in FIG. 3, the cover recessed parts 90 are recessed downward from the top surface 86U of the lower protrusion part 86. A depth dimension of the cover recessed parts 90 (a lower inner surface 90A of the cover recessed parts 90 from the top surface 86U of the low protrusion part 86) is set to be substantially the same as that of the notch recessed parts 26 of the support frames 25. As shown in FIG. 7, when the power storage device 40 is assembled under the vehicle frame 20, the lower end portions of the support frames 25 are fitted into the cover recessed parts 90 from above, and do not interfere with the fitting of the fitting protrusion parts 95 into the notch recessed parts 26 of the support frames 25.

This embodiment is thus constituted. Next, operations and effects of the vehicle mounting structure 10 for the power storage device 40 will be explained.

Figure 8:
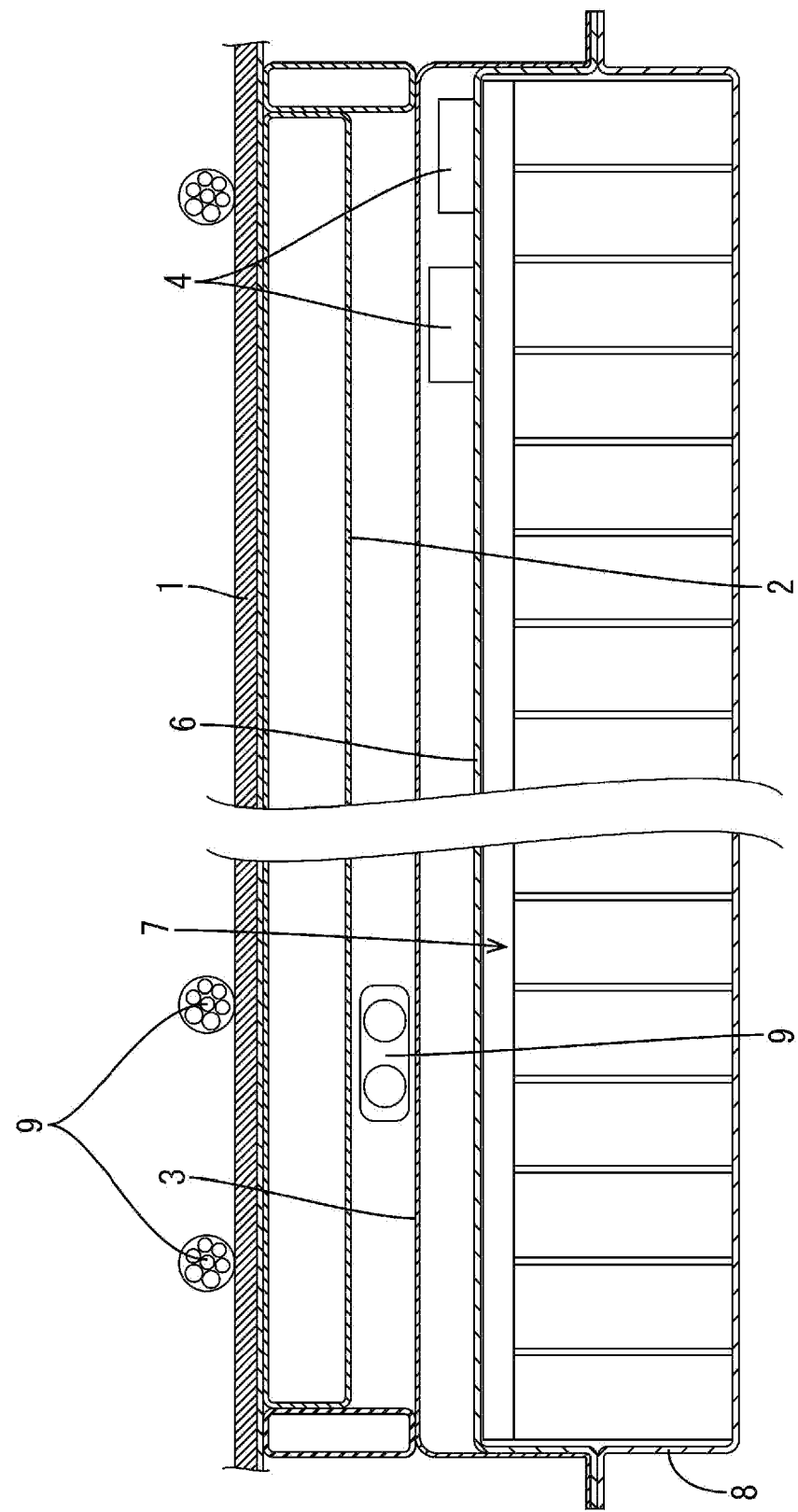
FIG. 8 is a conceptual diagram of a cross section of a vehicle mounting structure for a power storage device in a conventional vehicle.

In general, when a power storage device B is assembled under a vehicle frame 2 which is a framework of a vehicle, as shown in FIG. 8, (i) a cover member 3 that is under a lower surface of the vehicle frame 2 on which a floor panel 1 and the like are mounted, (ii) junction boxes 4, (iii) a power storage frame 6, (iv) a power storage element group 7 constituted by a plurality of power storage elements, and (v) a case 8 that houses the power storage element group 7, and the like are vertically stacked.

Additionally, a wire harness 9 connecting a device mounted in the vehicle is routed above the floor panel 1, between the vehicle frame 2, and the like. As a result, a vertical height dimension of a routing structure for the power storage device B becomes large, and a passenger compartment space of the vehicle becomes small.

Thus, to resolve the above problem, these inventors conducted diligent studies. As a result, they discovered the vehicle mounting structure 10 for the power storage device 40 comprising (i) the vehicle frame 20 having the floor panel 32 mounted thereabove and (ii) the power storage device 40 assembled under the vehicle frame 20, wherein, as shown in FIG. 7, (i) the cover protrusion part 84 that can be vertically fitted with the frame recessed parts 24 arranged in the vehicle frame 20 is arranged in the power storage cover member 80 of the power storage device 40, and (ii) the support frames 25 that can be vertically fitted with the cover recessed parts 90 arranged in the power storage cover member 80 of the power storage device 40 are arranged in the vehicle frame 20.

According to the vehicle mounting structure 10 for the power storage device 40 that is thus constituted, as shown in FIG. 7, as the frame recessed parts 24 and the cover protrusion part 84 are vertically fitted with each other, the cover recessed parts 90 and the support frames 25 are vertically fitted with each other, whereby (i) the vehicle frame 20 on which is mounted the floor panel 32 and (ii) the power storage device 40 are arranged at the same height. That is, compared to a conventional case in which the power storage device B is assembled so as to be stacked vertically on the lower surface of the vehicle frame 2, for a length dimension, in a fitting direction in which (i) the frame recessed parts 24 and the cover protrusion part 84 or (ii) the cover recessed parts 90 and the support frames 25 vertically fit with each other, the height dimension of the vehicle mounting structure 10 for the power storage device 40 can be made small.

Further, according to this embodiment, the power storage device 40 has (i) the plurality of power storage modules 50 and (ii) the power storage cover member 80 assembled to the plurality of power storage modules 50 so as to cover the top portions of the plurality of power storage modules 50. As shown in FIGS. 4 and 7, in the power storage cover member 80, the plurality of electrical wires W is aligned flat and fixed along the lower surface 84D that is a surface of the cover protrusion part 84 of the power storage cover member 80.

In other words, the plurality of electrical wires W is fixed flat to the lower surface 84D of the cover protrusion part 84 of the power storage cover member 80 of the power storage device 40; thus, for example, compared to a case in which a bundle of electrical wires bundling a plurality of electrical wires connecting between devices is routed on the surface of the floor panel, between the vehicle frame, and the like, the vehicle mounting structure 10 can be made smaller vertically. As a result, a passenger compartment RM of the vehicle can be kept large.

Further, according to this embodiment, as shown in FIG. 7, the plurality of electrical wires W includes (i) the plurality of small-diameter electrical wires SW and (ii) the plurality of large-diameter electrical wires LW whose diameter is larger than that of the plurality of small-diameter electrical wires SW. The horizontal width dimension of the large-diameter electrical wires LW is set to be larger than the vertical height dimension of the large-diameter electrical wires LW.

That is, according to this embodiment, the large-diameter electrical wires LW are made flat, whereby the height dimension is made small. Thus, for example, compared to electrical wires having substantially the same height and width, the large-diameter electrical wires LW having a large cross-sectional area can be routed in the space S between the power storage modules 50 and the power storage cover member 80.

In other words, the large-diameter electrical wires LW having a large cross-sectional area can be routed in the space S, which was originally a wasted space, between the power storage modules 50 and the power storage cover member 80. Thus, for example, compared to a case in which the large-diameter electrical wires are routed on the surface of the floor panel and between the vehicle frame, the vehicle mounting structure 10 can be made even smaller vertically.

Further, as shown in FIGS. 5 and 7, the plurality of small-diameter electrical wires SW and the plurality of large-diameter electrical wires LW according to this embodiment are fixed to the lower surface 84D at the power storage modules 50 side at the cover protrusion part 84 of the power storage cover member 80.

In general, when electrical wires are routed, exterior members are attached to the outer circumference of the electrical wires so as to suppress other members and the like from coming into contact with the electrical wires and damaging them. However, when exterior members are attached to respective electrical wires, the vertical height of the electrical wires becomes large, and as the number of parts increases, the man-hours for assembling exterior members and manufacturing costs increase.

However, according to this embodiment, the plurality of electrical wires W connecting between devices is routed within the power storage device 40; thus, exterior members that protect the plurality of electrical wires W can be eliminated.

That is, the power storage device 40, and ultimately, the height dimension of the vehicle mounting structure 10 for the power storage device 40, can be made smaller for the portion that does not require the exterior member. At the same time, the number of parts can be reduced. Further, the plurality of electrical wires W is routed within the power storage device 40, so routing of the electrical wires W between devices can be completed simply by securing a location in which the power storage device 40 is assembled to the vehicle C. That is, routing of the plurality of electrical wires W can be completed without designing the route of the electrical wires W for each vehicle type.

Some of the small-diameter electrical wires SW of the plurality of electrical wires W connect the plurality of power storage modules 50 with each other.

In general, when power storage modules are connected with each other by electrical wires in the power storage device, electrical wires are routed between the power storage modules. Thus, it is necessary to secure an area for routing electrical wires other than an area for arranging the power storage modules, and the overall space in which the power storage modules are arranged becomes large. It is difficult to enlarge the arrangement space in the vehicle, and when it is not possible to secure a large arrangement space, the power storage modules become small, whereby a power storage capacity of the power storage device becomes small.

However, according to this embodiment, the plurality of electrical wires W is aligned flat and routed in the power storage cover member 80 covering the power storage modules 50. Thus, for example, compared to a case in which electrical wires are arranged between power storage modules, the vehicle mounting structure 10 for the power storage device 40 can be made smaller vertically while suppressing an increase in space at which the power storage modules 50 are arranged and a decrease in power storage capacity.

Other Embodiments

The technology disclosed in this specification is not limited to the above embodiment explained in the description and the drawings, but includes, for example, the following various aspects.

(1) In the above embodiment, the vehicle frame 20 is formed in a ladder shape (a so-called "ladder frame").

However, it is not limited to this. The vehicle frame may be a platform type or a floorpan type with a monocoque structure.

(2) In the above embodiment, the power storage device 40 is configured to include (i) two types of low-voltage power storage modules 51 and (ii) one type of high-voltage power storage module 60. However, it is not limited to this, and two or less or four or more power storage modules of the power storage device may be used. One type of low-voltage power storage module and one type of high-voltage power storage module may be used as one type each, or multiple types may be used for each.

(3) In the above embodiment, the plurality of small-diameter electrical wires SW and the plurality of large-diameter electrical wires LW are arranged between the power storage modules 50 and the power storage cover member 80. However, it is not limited to this. Routing grooves may be provided on an outer surface of the top portion of the power storage cover member, and the plurality of small-diameter electrical wires and the plurality of large-diameter electrical wires may be arranged within the routing grooves. Only one of (i) the small-diameter electrical wires and (ii) the large-diameter electrical wires may be arranged in an external routing groove. Further, all the electrical wires may be configured with the same diameter.

The invention claimed is:

1. A vehicle mounting structure comprising:
 a vehicle frame having a floor panel mounted thereabove;
 a power storage device assembled under the vehicle frame; and
 a continuous metal cover covering the power storage device, wherein:
  a protrusion, which is a protruding part of the continuous metal cover, is vertically fitted into a recess in the vehicle frame, and
  a plurality of electrical wires are arranged within a space between an underside of the protrusion and an upper side of the power storage device.

2. The vehicle mounting structure according to claim 1, wherein:
 the power storage device is provided with:
  (i) a plurality of power storage modules, and
  (ii) a power storage cover, which is the continuous metal cover, assembled to the plurality of power storage modules so as to cover tops of the plurality of power storage modules; and
 in the power storage cover, the plurality of electrical wires is aligned flat and fixed along a surface of the power storage cover.

3. The vehicle mounting structure according to claim 2, wherein:
 the plurality of electrical wires include:
  (i) a plurality of small-diameter electrical wires, and
  (ii) a plurality of large-diameter electrical wires whose diameter is larger than that of the plurality of small-diameter electrical wires; and
 a horizontal width dimension of a large-diameter electrical wire of the plurality of large-diameter electrical wires is set to be larger than a vertical height dimension of the large-diameter electrical wire.

4. The vehicle mounting structure according to claim 2, wherein:
 the plurality of electrical wires is fixed to a surface at a power storage modules side of the power storage cover.

5. The vehicle mounting structure according to claim 3, wherein:
 a predetermined number of electrical wires of the plurality of electrical wires connect the plurality of power storage modules with each other.

* * * * *